United States Patent

Wald et al.

[11] Patent Number: 6,042,621
[45] Date of Patent: Mar. 28, 2000

[54] FIBRE-REACTIVE DYESTUFFS

[75] Inventors: Roland Wald, Huningue, France; Paul Doswald, Münchenstein, Switzerland

[73] Assignee: Clariant Finance (BV) Limited, Tortola, Virgin Islands (Br.)

[21] Appl. No.: 09/117,996

[22] PCT Filed: Feb. 6, 1997

[86] PCT No.: PCT/EP97/00517

§ 371 Date: Aug. 11, 1998

§ 102(e) Date: Aug. 11, 1998

[87] PCT Pub. No.: WO97/30125

PCT Pub. Date: Aug. 21, 1997

[30] Foreign Application Priority Data

Feb. 12, 1996 [GB] United Kingdom ............... 9602787

[51] Int. Cl.[7] .................. C09B 62/085; C09B 67/22; D06P 1/382
[52] U.S. Cl. .................. 8/549; 8/638; 8/641; 8/918; 8/924; 8/682; 534/638; 534/753; 534/772; 534/784; 534/786; 534/885; 534/886
[58] Field of Search ............... 8/641, 918, 924, 8/917, 437, 588; 534/632, 638, 753, 772, 784, 786, 885, 886

[56] References Cited

U.S. PATENT DOCUMENTS

| | | |
|---|---|---|
| 3,926,944 | 12/1975 | Berrie et al. . |
| 4,001,205 | 1/1977 | Beuhler et al. . |
| 4,191,687 | 3/1980 | Austin . |
| 4,261,889 | 4/1981 | Seiler et al. . |
| 5,163,971 | 11/1992 | Stawitz et al. . |

FOREIGN PATENT DOCUMENTS

| | | |
|---|---|---|
| 458152 | 11/1991 | European Pat. Off. . |
| 503339 | 9/1992 | European Pat. Off. . |
| 2295094 | 7/1996 | Germany . |

*Primary Examiner*—Margaret Einsmann
*Attorney, Agent, or Firm*—Scott E. Hanf

[57] ABSTRACT

The application is concerned with a compound of the formula (I)

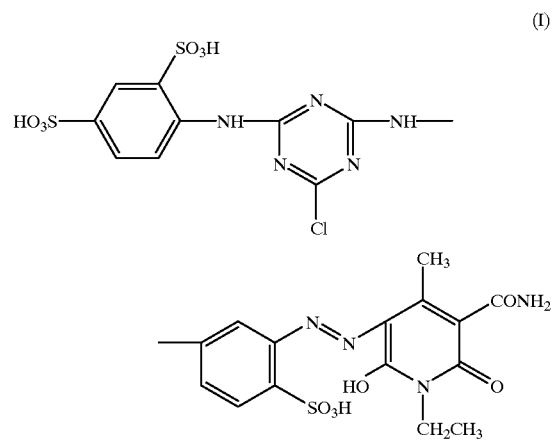

and a process for making the same. The compound is useful as fiber-reactive dyestuff in dyeing or printing onto hydroxy- or nitrogen-containing substrates. A printing composition comprising this fiber-reactive dyestuff and a copper phthalocyanine allows to obtain dyeings with less catalytic fading.

9 Claims, No Drawings

FIBRE-REACTIVE DYESTUFFS

This invention relates to fibre-reactive dyestuffs, a process of making the same and to their use in dyeing or printing hydroxy-group-containing or nitrogen-containing organic substrates.

According to the invention there is provided a fibre-reactive dyestuff which is a compound of the formula (I)

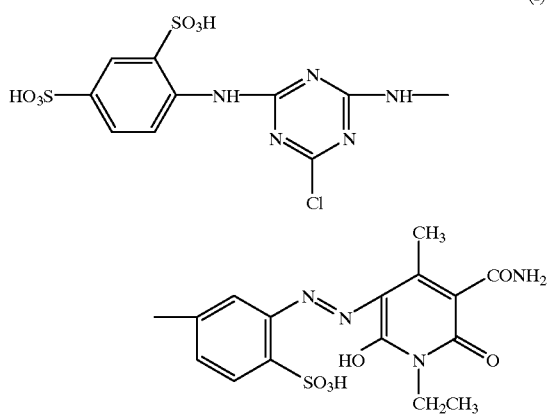

or a salt thereof.

When a fibre-reactive dyestuff of formula (I) is in its salt-form, the cation associated with the sulpho-groups is not critical and may be any of those non-chromophoric cations conventional in the field of fibre-reactive dyestuffs provided that the corresponding salt is substantially water soluble. Examples of such cations are alkali metal cations, for example potassium or sodium ions and ammonium cations, e.g. mono-, di-, tri- and tetra-methyl or mono-, di-, tri- and tetra-ethyl ammonium cations. The cations may be the same or different, i.e. the compounds may be in mixed salt-form.

A fibre-reactive dyestuff of formula (I) displays good compatibility with other known dyestuffs. Accordingly, it may be mixed with other dyestuffs to form a composition which can be used to dye or print suitable substrates. Said other dyestuffs must be compatible with a compound of formula (I), that is, they must have similar dyeing or printing properties, for example fastness properties.

Accordingly, the invention provides in another of its aspects a dyeing or printing composition comprising a fibre-reactive dyestuff of the formula (I).

In a preferred dyeing or printing composition a fibre-reactive dyestuff of formula (I) is combined with certain blue dyestuffs selected from suitable phthalocyanine dyestuffs. In particular, there is contemplated a composition comprising a fibre-reactive dyestuff of the formula (I) and a copper phthalocyanine, more particularly C.I. reactiv Blue 207.

Printing compositions comprising a fibre-reactive dyestuff and a copper phthalocyanine have heretofore suffered from the effect known in the art as catalytic fading, whereby the copper phthalocyanine catalyses the selective fading of the hue of the fibre-reactive dyestuff. This has the unfortunate effect that any substrate coloured by such a composition exhibits a progressive and rapid loss of the hue of the printing composition in favour of the blue colouration of the copper phthalocyanine when exposed to light. A printing composition comprising a fibre-reactive dyestuff of the formula (I) and a copper phthalocyanine displays a marked decrease in this tendency to fade.

A dyeing or printing composition according to the invention preferably contains a fibre-reactive dyestuff of formula (I) and a copper phthalocyanine in a ratio of 2:1 by weight. The remaining mass of the printing composition consists of water such that in 100 parts by weight of the dyeing or printing composition there are N parts of dyestuffs and 100-N parts of water.

In another aspect of the invention there is provided a process of forming a fibre-reactive dyestuff of formula (I) or a salt thereof comprising the step of reacting a compound of the formula (I)

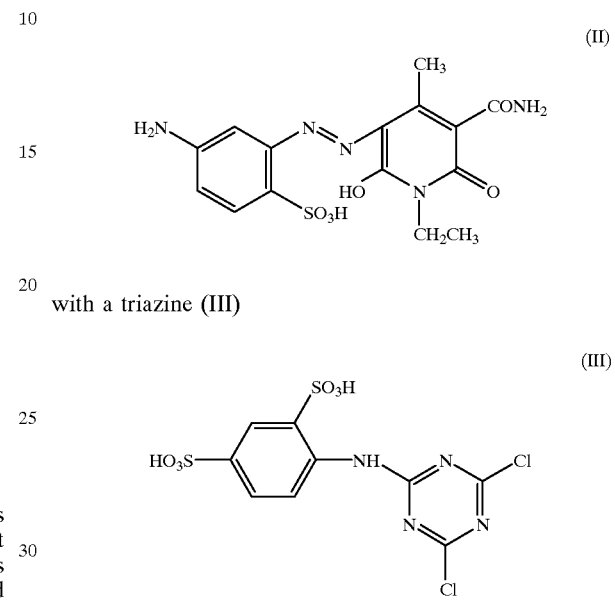

with a triazine (III)

The process is preferably carried out in an aqueous medium at a temperature of from 3 to 40° C., more preferably 5 to 10° C. and at a pH of between 4 to 10, more preferably 6 to 8.

A fibre-reactive dyestuff of formula (I) may be isolated in accordance with known methods, for example by salting out, filtering and drying optionally in vacuum and at slightly elevated temperature.

Depending on the reaction and/or isolation conditions, a fibre-reactive dyestuff of the formula (I) may be obtained in free-acid or salt-form or mixed salt-form, containing, for example one or more of the above-mentioned cations. A fibre-reactive dyestuff of formula (I) may be converted from salt-form or mixed salt-form to free-acid form or vice versa using conventional techniques.

The compounds (II) and (III) are derivable by well known syntheses from commonplace starting materials well known to persons skilled in the art and need no further discussion here.

A fibre-reactive dyestuff of the formula (I) is useful as a fibre-reactive dyestuff for dyeing or printing hydroxy-group-containing or nitrogen-containing organic substrates. Preferred substrates are leather and fibrous materials which comprise natural or synthetic polyamides and, particularly, natural or regenerated cellulose such as cotton, viscose and spun rayon. The most preferred substrates are textile materials comprising cotton.

Accordingly, in another aspect of the invention there is provided the use of a fibre-reactive dyestuff according to the formula (I) or a salt thereof as a fibre-reactive dyestuff for dyeing or printing hydroxy-group-containing or nitrogen-containing organic substrates.

Dyeing or printing may be carried out in accordance with known methods conventional in the fibre-reactive dyestuffs field.

In a preferred dyeing process the exhaust-dyeing method is used at temperatures within the range of from 60 to 100° C., more preferably 80 to 100° C. A fibre-reactive dyestuff of formula (I) gives good exhaust and fixation yields. Moreover, any unfixed dyestuff is easily washed from the substrate.

In a preferred printing process, the padding method is used, for example pad-steam, pad-thermofix, pad-dry, pad-batch, pad-jig and pad-roll. Alternatively, printing may be carried out using ink-jet methods.

A dyeing or print obtained with said fibre-reactive dyestuff exhibits good wet and light fastness. They also exhibit good resistance to oxidising agents such as chlorinated water, hypochlorites, peroxides and perborate-containing washing detergents. Furthermore, a dyeing or print obtained with said fibre-reactive dyestuff of formula (I) display high stability to acid hydrolysis, for example a dyeing when contacted with dilute acetic acid only causes a slight staining of an undyed accompanying fabric.

Dyeings and prints obtained using mixtures of dyestuffs display good fastness properties which are comparable with those fastness properties obtained with a compound of formula (I) alone.

There now follows a series of examples which serve to illustrate the invention.

EXAMPLE 1

23 parts of 4-acetylamino-2-aminobenzenesulphonic acid in 150 parts of water, 7 parts of sodium nitrite, 49 parts of hydrochloric acid (30%) and 115 parts of ice are mixed together with stirring. After 30 minutes any excess sodium nitrite is neutralised with a little sulphamic acid. To the resultant solution is added 17.9 parts of 1-ethyl-5-carbamoyl-6hydroxy-4-methylpyridone in 100 parts of water and 12 parts of sodium hydroxide (30%) with stirring. After 30 minutes, 69 parts of hydrochloric acid (30%) are added and the resultant mixture is heated to a temperature of 75 to 80° C. for 4 to 5 hours. The mixture is then cooled and filtered to provide an orange solid having the formula (II)

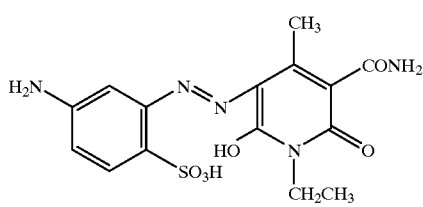

(II)

27.5 parts of 1-amino-benzene-2,4-disulphonic acid are suspended in 300 parts of water. This suspension is dissolved using 23 parts of sodium hydroxide (30%). To the resulting solution is added 20.5 parts of 2,4,6-trichlorotriazine in 100 parts of water and 200 parts of ice. The reaction medium is maintained at 5° C. and at a pH of 4.5 to 5 with the addition of 6 parts of sodium bicarbonate. The resultant solution is added to the compound of formula (II) obtained by the process described above in 200 parts of water. This mixture is adjusted to pH 7 with 30 parts of sodium hydroxide (30%). The mixture is then stirred for 3 to 4 hours at 5–10° C. Upon completion of the reaction a compound having a formula (I) is isolated by filtration and dried under vacuum.

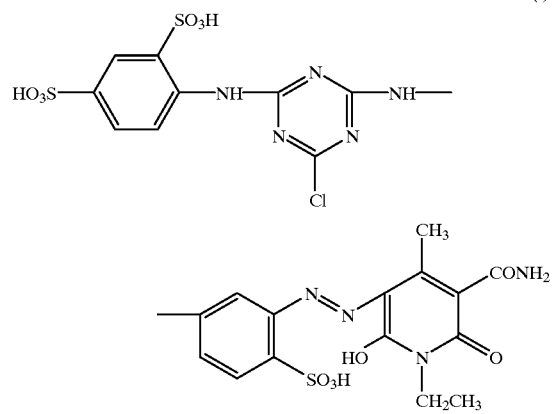

(I)

Compound (I) dyes cotton to a greenish yellow colour. The printings exhibit excellent light and wet fastness properties and are resistant to oxidative influences.

APPLICATION EXAMPLE A

A mixture of the following composition is formed

| | |
|---|---|
| 40 | parts dyestuff from example 1 |
| 100 | parts urea |
| 330 | parts water |
| 500 | parts of a 4% sodium alginate thickener |
| 10 | parts 1-nitrobenzol-3-sulphonic acid sodium |
| 20 | parts soda |
| 1000 | parts altogether |

The composition formed above is applied to a cotton fabric in accordance to conventional printing methods. The printed fabric is then dried and fixed in steam at 102°–104° C. for 4 to 8 minutes.

The dyed fabric is then rinsed in cold and hot running water and thereafter washed in hot water for a further 3 minutes. After rinsing in hot running water and centrifuged, the dyeing is then dried. A greenish/yellow dyeing is obtained displaying good wet and light fastness properties and good stability towards oxidative influences.

APPLICATION EXAMPLE B

A mixture of the following composition is formed

| | |
|---|---|
| 100 | parts urea |
| 315 | parts water |
| 415 | parts of a 4% sodium alginate thickener (Lamitex L10 10%) |
| 10 | parts 1-nitrobenzol-3-sulphonic acid sodium |
| 25 | parts soda |
| 900 | parts altogether + a printing composition consisting of |
| 32 | parts dyestuff from example 1 |
| 16 | parts of a blue dyestuff C.I. Blue 207 |
| 52 | parts water |

The composition formed above is applied to a cotton fabric in accordance with the procedure described in Application Example A.

A brilliant green print is obtained displaying good wet and light fastness properties and good stability towards oxidative influences. Furthermore, the print is resistant to catalytic fading.

We claim:

1. A fibre-reactive dyestuff having the formula (I)

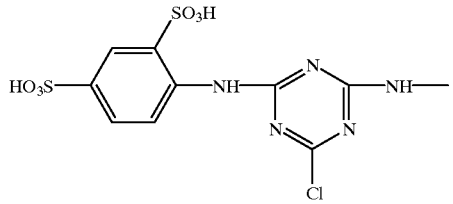 (I)

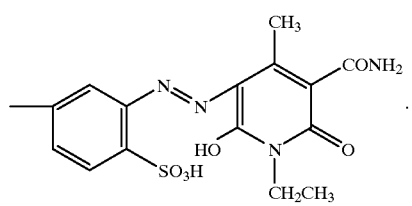

2. A dyeing or printing composition comprising a fibre-reactive dyestuff of formula (I) as defined in claim 1 and a copper phthalocyanine.

3. A dyeing or printing composition according to claim 2 wherein the copper phthalosyanine is C.I. Reactive Blue 207.

4. A dyeing or printing composition according to claim 2 wherein the weight ratio of the fibre-reactive dyestuff of formula (I) to copper phthalocyanine is 2:1.

5. A process of forming a fibre-reactive dyestuff of formula (I) as defined in claim 1 or a salt thereof comprising the step of reacting a compound of the formula (II)

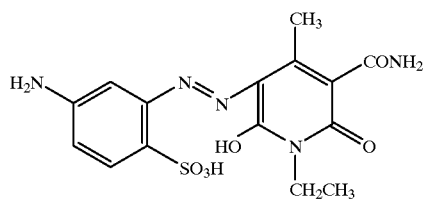 (II)

with a triazine (III)

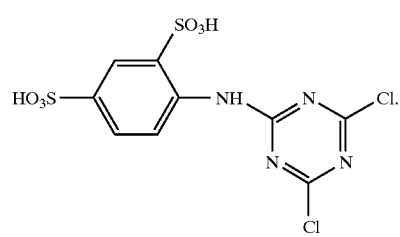 (III)

6. A method of dyeing or printing hydroxy-group-containing or nitrogen-containing organic substrates by adding the fibre-reactive dyestuff of formula (I) as claimed in claim 1.

7. A method of printing hydroxy-group-containing or nitrogen-containing organic substrates by adding the dyeing or printing composition as defined in claim 2.

8. A hydroxy-group-containing or nitrogen-containing organic substrate dyed with a fibre-reactive dyestuff of formula (I) as defined in claim 1.

9. A hydroxy-group-containing or nitrogen-containing organic substrate printed with a dyeing or printing composition according to claim 2.

* * * * *